United States Patent
Jen

(10) Patent No.: US 6,551,675 B2
(45) Date of Patent: Apr. 22, 2003

(54) MANUFACTURING METHOD OF A COPOLYESTER CONTAINING ETHYLENE NAPHTHALATE UNIT (EN) AND ITS APPLICATION

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/853,572

(22) Filed: May 14, 2001

(65) Prior Publication Data

US 2003/0039776 A1 Feb. 27, 2003

(51) Int. Cl.⁷ ................................ B29D 22/00
(52) U.S. Cl. .................. 428/35.7; 528/275; 528/279; 528/281; 528/285; 528/298; 528/302; 528/308; 528/308.6; 264/331.11; 264/503; 264/513; 428/36.92
(58) Field of Search ................. 528/275, 279, 528/281, 285, 298, 302, 308, 308.6; 264/331.11, 503, 513; 428/35.7, 36.92

(56) References Cited

U.S. PATENT DOCUMENTS

| | | |
|---|---|---|
| 5,594,092 A | 1/1997 | Burkett et al. |
| 5,811,513 A | 9/1998 | Iwasaki et al. |
| 5,895,807 A | 4/1999 | Galko et al. ............ 525/444 |
| 5,976,653 A | 11/1999 | Collette et al. |
| 6,031,065 A | 2/2000 | Nichols et al. ............ 528/271 |

FOREIGN PATENT DOCUMENTS

| | | |
|---|---|---|
| TW | 287177 | 10/1996 |
| TW | 304176 | 5/1997 |
| TW | 358816 | 5/1999 |

*Primary Examiner*—Samuel A. Acquah
(74) *Attorney, Agent, or Firm*—Stevens, Davis, Miller & Mosher, LLP

(57) ABSTRACT

A manufacturing method of the copolyester containing 2,6-ethylene naphthalate unit (EN) by using 2,6-naphthalenedicarboxylic acid (NDA), purified terephthalic acid (PTA), and ethylene glycol (EG) to proceed with esterification or by using dimethyl 2,6-naphthalenedicarboxylate (NDC), dimethyl terephthalate (DMT), EG, and transesterification catalyst to proceed with transesterification reaction or by PTA process.

While the esterification reaction reaches 85~98 percent of esterification ratio, NDC, EG, and transesterification catalyst are added to proceed with transesterification reaction. The monomer obtained from previous procedure is added with polymerization catalyst thereafter to proceed with polycondensation reaction to produce copolyester of which the viscosity is increased through solid state polymerization. Then, the copolyester is ejected to be blow-molded so as to produce the one-way bottle which can meet the requirement of pasteurization.

12 Claims, No Drawings

MANUFACTURING METHOD OF A COPOLYESTER CONTAINING ETHYLENE NAPHTHALATE UNIT (EN) AND ITS APPLICATION

BACKGROUND OF THE INVENTION

1. Field of the Invention

The present invention relates to a manufacturing method of a copolyester containing ethylene naphthalate unit (EN) and its application. The present invention discloses a manufacturing method of using 2,6-naphthalenedicarboxylic acid (NDA), purified terephthalic acid (PTA), and ethylene glycol (EG) to proceed with esterification reaction or using dimethyl 2,6-naphthalenedicarboxylate (NDC), dimethyl terephthalate (DMT), EG, and transesterification catalyst to proceed with transesterification reaction or using the PTA process. While the esterification reaction reaches 85~98 percent of esterification ratio, NDC, EG, and transesterification catalyst are added to proceed with transesterification reaction. The monomer obtained from each of previous process is added with polymerization catalyst thereafter to proceed with polycondensation reaction to produce copolyester. The produced copolyester is further polymerized at solid state to increase its viscosity. Then, the copolyester is ejected to be blow-molded so as to produce the one-way bottle which can be pasteurization.

2. Problems to be Solved by the Present Invention

Polyethylene terephthalate (PET) is widely used in food packaging vessel, fiber, film, and transparent sheet at the present time, particularly in food packaging vessel owing to its environmental advantages such as light weight, high transparency and shinning, good air impermeability, and being recyclable. Therefore, it's greatly used to manufacture bottles for carbonic beverage, juice, mineral water. However, PET bottles are recently used to contain those which are sensitive to oxygen such as beer, milk, food product, potato product, which require higher standard for the permeability of carbon dioxide. Especially, a common PET bottle is lack of the capability of preventing the oxygen from getting into the bottle and of preventing the carbon dioxide from permeating out of the bottle while containing beer product. Besides, the common PET bottle can not meet the requirement of pasteurization while filling. Therefore, several prior arts disclose the method of improving the air impermeability of present PET bottle. One of the prior arts is to use di-ester or di-acid compound which contains di-cyclobenzene structure, such as dimethyl 2,6-naphthalenedicarboxylate or 2,6-naphthalenedicarboxylic acid to react with excess ethylene glycol to obtain homopolymer polyethylene naphthalate (PEN) thereby. PEN owns very good glass transition temperature (Tg) up to 120° C. so as to be able to meet the requirement of pasteurizatio. Consequently, PEN bottle has already been used in packaging beer by some brewer. However, PEN has its limitation in application due to higher price. Therefore, PEN bottles are nowadays recycled for many times. Some of the prior arts then blend PEN and PET so as to decrease the cost and also improve the air impermeability and heat durability. Nevertheless, the blending of the two polymers involve the difference of their adaptability. Therefore, an appropriate physical specification should be concerned when they are blended.

The present invention thus discloses a manufacturing method of PET copolymer which contains an appropriate amount of PEN. The copolymer does not have the said problem of adaptability; and the bottle made of the copolymer is suitable for one-way bottle and can meet the requirement of pasteurization.

3. Description of Prior Arts

The prior arts which intend to solve the said problem of adaptability are discussed as follows:

The U.S. Pat. No. 5594092 of Shell corp. discloses a process of combining both PTA process and transesterification reaction to produce either PET copolyester containing PEN or PEN copolyester containing PET. The NDC, EG, and transesterification catalyst react to produce monomer—BHEN which is further added with polymerization catalyst to proceed with polymerization so as to have the molecular weight of BHEN monomer being between 4800 and 24200. Then, the BHEN monomer is injected to the esterification reaction of PET process. Further, through polymerization reaction, the PET/PEN copolyester is produced. This patent claims the PEN component of the copolyester is between 2~5 mole %.

The U.S. Pat. No. 5895807 of Shell corp. discloses a process of combining both PTA process and transesterification reaction to produce either PET copolyester containing PEN or PEN copolyester containing PET. The NDC, EG, and transesterification catalyst react to produce BHEN. While the molecular weight of BHEN is below 400, the BHEN is injected to the esterification reaction of PET process. Further, through polymerization reaction, the PET/PEN copolyester is produced. This patent claims the PEN component of the copolyester is between 1~15 mole %.

The U.S. Pat. No. 6031065 of Wellman corp. discloses a process, wherein the NDC is injected into the first tank of esterification in PTA process. The produced water and methyl alcohol are transformed into carbon dioxide and water by the combustion equipment at the top of distillation tower.

The PEN disclosed by the ROC patent No. 82111169 of the PET Continental Technology corp. of the USA is applied in multi-layer refilled container which differs from the one-way bottle.

The ROC patent No. 85113329 of Japan Mitsui Chemical Corp. discloses a process of combining NDA and EG into PEN homopolymer on condition of existing in water which differs from the PET copolyester containing a little PEN of the present invention.

The naphthalene irregular copolyester disclosed by ROC patent No. 84107601 of the ROC National Science Committee contains two repeat units. The first repeat unit contains the following formula:

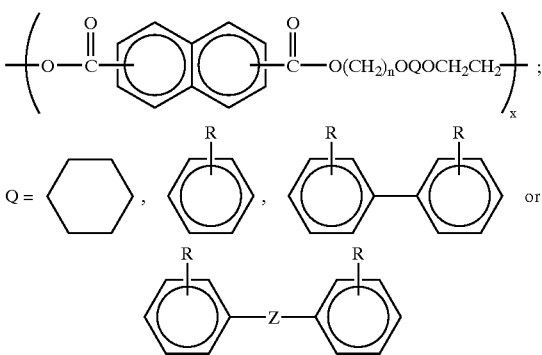

The second repeat formula contains the following formula:

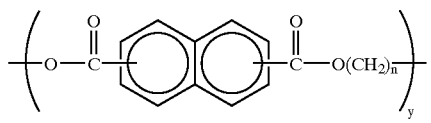

The copolyester thereof differs from the PET copolyester containing a little PEN of the present invention.

The Technical Skill Utilized by the Present Invention

One of the practiced examples is to use a relatively less but appropriate amount of NDC or NDA to react with a relatively greater amount of DMT or PTA so as to produce the PET copolyester which contains a less but appropriate amount of PEN. The main body of the copolyester is the ethylene terephthalate unit, the structural formula of which is as follows:

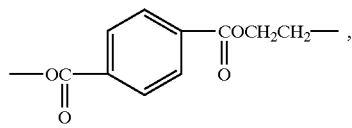

and the structure formula of the ethylene naphthalate unit which is less but appropriate in terms of quantity is as follows:

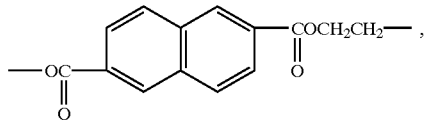

the bottle made of the said copolyester owns a better air impermeability than the common PET bottle and meets the requirement of hot filling. The air impermeability of the bottle made of the said copolyester may be not so good as that of the bottle made of PEN though, the price of which has the advantage of lower cost. This characteristic contributes to a wide application of the one-way bottle which needs to meet the requirement of pasteurization. In addition, the adaptability between the ethylene terephtahlate unit and ethylene naphthalate unit in the copolyester is good while blended.

The main body of the copolyester in the present invention can be polyethylene terephthalate (PET), or polypropylene terephthalate (PPT), or polybutylene terephthalate (PBT), among which the PET is preferable.

Furthermore, there are two manufacturing methods of PET for the prior art. One is using purified PTA as raw material which goes on esterification reaction with excess EG. While the esterification ratio reaches above 95 percent, the polymerization reaction proceeds so as to obtain PET. This method is called PTA process. The other one is using DMT as raw material which goes on transesterification with excess EG and then goes on polymerization so as to obtain PET. This method is called DMT process. The PTA process has advantages of better skill and lower cost. From technical point of view, the PTA process does not produce methyl alcohol so that the wastewater at the top of distillation tower is relatively easier to treat. In addition, the excess EG required for PTA process is less than that required for DMT process. In addition, the PTA process does not need to use the esterification catalyst; however, the DMT process does need to use transesterification catalyst. Therefore, the residual metal in the PET produced by PTA process is relatively low which makes better color and quality of PET. Furthermore, from economical point of view, the cost of PTA is lower than that of DMT and the raw material of PTA is relatively easier to get. Therefore, the present commercialized process mostly used for producing PET is the PTA process.

Due to the continuous expanding of application for the PET, it is considered, from chemical structure point of view, that to add more di-acid and one or more than one di-ol in the PTA process to produce copolyester, or to add more di-ester and one or more than one di-ol in the DMT process to produce copolyester can give PET a different character. The present invention discloses a PET copolyester containing PEN, which can be obtained through adding 2,6-naphthalenedicarboxylic acid during the stage of esterification in PTA process or through adding dimethyl 2,6-naphthalenedicarboxylate and transesterification catalyst during the stage of transesterification in DMT process, then through polymerization reaction.

The PTA process, which is utilized to manufacture PET copolymer containing PEN, has said advantages though, the commercialized NDA is not thoroughly purified and is very expensive; besides, the source to obtain NDA is rare. Therefore, the cost of PET copolyester containing PEN in the PTA process, which uses the NDA in the market as raw material, is relatively high and its color is inclined to yellow. While manufacturing the copolyester through DMT process by using NDC as raw material, there exists the above said defects. While manufacturing the PET copolyester containing PEN through PTA process by using NDC as raw material, the acid component in the PTA process restrains the reaction of NDC which inhibits further polymerization so as not to obtain copolyester.

Therefore, the other practiced example of the present invention is to disclose the manufacturing method of the PET copolyester containing less but appropriate amount of PEN. The said copolyester can be obtained through PTA process by using NDA as raw material, or through DMT process by using NDC as raw material, or through PTA process, under certain conditions, by using NDC as raw material. The obtained copolyester is suitable in manufacturing the one-way bottle which can be pasteurized. In addition, the obtained copolyester owns an advantage of low cost.

It is declared here that the manufacturing method disclosed by the second practiced example of the present invention is not to limit the first practiced example of the present invention but to be the copolyester manufacturing method of the first practiced example of the present invention.

Detailed Description of the Present Invention

One of the manufacturing method of the copolyester of the present invention is to add 2,6-naphthalenedicarboxylic acid (material source: BP inc., material No. NDA-33) into the thick liquid of PTA and EG, or to add NDA-33 during the esterification of PTA and EG. While the esterification ratio reaches above 95 percent, preferably above 96.5 percent, add polymerization catalyst to further go on polymerization at a vacuumed environment.

The content of NDA-33 of the present invention is 5~15 mole % based on copolyester, preferably 8~15 mole %. While said content is lower than 5 mole %, the improvement of impermeability is not good enough. While said content is above 15 mole %, the polymer becomes amorphous state which makes agglomeration during the succeeding solid state polymerization so that it is uneasy to raise the viscosity.

The injection time point of NDA-33 of the present invention is at the transesterification ratio being lower than 85 percent, preferably lower than 50 percent. More preferably, the NDA-33 is injected into the thick liquid of PTA and EG. The mole ratio of EG to both PTA and NDA-33 is between 1.1 and 2.5, preferably between 1.5 and 2.0.

The catalyst suitable for polymerization is the antimony catalyst such as antimony trioxide, antimony acetate, or the germanium catalyst such as germanium dioxide, tetraethyl germanium oxide, n-tetrabutyl germanium oxide, or the titanium catalyst such as tetrabutyl titanium oxide. The quantity of the additive is between 0.001 wt % and 0.06 wt % (corresponding to the weight of polymer).

During the esterification reaction, the heat stabilizer such as phosphoric acid or phosphorous acid, and the toner such as cobaltous acetate, and the other characteristic improving additives can be added.

The polymerization can be split into two stages. The first stage is the pre-polymerization, of which the reaction pressure decreases from normal pressure to 30 torr. The reaction duration is one hour. The reaction temperature is between 260 .degree. C. and 275° C. The second stage is the main polymerization reacton, of which the reaction pressure is lower than one torr. The reaction temperature is between 275° C. and 290° C. While the reaction proceeds until the intrinsic viscosity is between 0.3 and 0.7, the polymer is compressed to column shape and is quickly cooled down by cooling water and is cut into chips.

The other manufacturing method of the copolyester of the present invention is to add dimethyl 2,6-naphthalenedicarboxylate (NDC, material source: BP inc.) into the melted state solution of PTA and EG, or to add DMT during the transesterification of DMT and EG. In addition, the transesterification catalyst such as manganese acetate is also added. While the side product of transesterification -methyl alcohol is totally removed, add polymerization catalyst to further go on polymerization at a vacuumed environment.

The content of NDC of the present invention is 5~15 mole % based on copolyester, preferably 8~15 mole %. While said content is lower than 5 mole %, the improvement of impermeability is not good enough. While said content is above 15 mole %, the polymer becomes amorphous state which makes agglomeration during the succeeding solid state polymerization so that it is uneasy to raise the viscosity.

The injection time point of NDC of the present invention is at the transesterification ratio being lower than 50 percent; preferably the NDC is injected into the solution of DMT and EG. The mole ratio of EG to both DMT and NDC is between 1.1 and 2.5, preferably between 1.5 and 2.0.

The transesterification takes place at a temperature between 150~260° C., and at normal pressure, the reaction time is 4~6 hours, preferably 4 hours depending on the collected amount of methyl alcohol.

The transesterification catalyst is manganese acetate or zinc acetate with a content of 100~500 ppm based on copolyester, preferably 300~400 ppm.

During the process of transesterification, the heat stabilizer such as phosphoric acid or phosphorous acid, and the tonner such as cobaltous acetate can be added; besides, other character improving additive can be added as well.

The catalyst suitable for polymerization is the antimony catalyst such as antimony trioxide, antimony acetate, or the germanium catalyst such as germanium dioxide, tetraethyl germanium oxide, n-tetrabutyl germanium oxide, or the titanium catalyst such as tetrabutyl titanium oxide. The quantity of the additive is between 0.001 wt % and 0.06 wt % (corresponding to the weight of polymer).

The process of polymerization is the same with that of said manufacturing method. While the reaction proceeds to this stage that the intrinsic viscosity is between 0.3~0.7, the polymer is compressed to column shape and is quickly cooled down by cooling water and is cut into chips.

The other manufacturing method of copolyester of the present invention is to use PTA process. While the esterification ratio reaches 85%~98%, the NDC, EG, and transesterification catalyst are injected to go on transesterification. While the side product—methyl alcohol produced by transesterification is totally collected by distillatory, the polymerization catalyst is injected to go on said polymerization. When the intrinsic viscosity reaches 0.3~0.7, the polymer is compressed to column shape and is quickly cooled down by cooling water and is cut into chips.

According to the manufacturing method of the present invention, the injection time of NDC, EG, and transesterification catalyst is at the stage that esterification ratio of PTA process being between 85%~98%, preferably 93%~97.5%. If the injection time is at the stage that esterification ratio being lower than 85%, the transesterification can not proceed because the transesterification catalyst loses its activation caused by the excessive acid component; consequently, the NDC can not be further processed to copolyester. While the esterification ratio is relatively high, say higher than 98%, the injection of NDC, EG, and transesterification catalyst can make the transesterification proceed. However, the transesterification reaction is accompanied by the esterification , which makes the esterification ratio too high. Eventually, the succeeding polymerization reaction can not reach enough molecular weight and the color of the product is yellow dark gray; in addition, the quantity of side product is too much.

The quantity of the addition of transesterification catalyst in this manufacturing method is between 100~500 ppm based on the weight of low polymer BHEN which is obtained from NDC and EG, preferably between 300~400 ppm.

The mole ratio of NDC and EG in this manufacturing method is between 1.2~2.0, preferably between 1.6~2.0.

The methyl alcohol and water, which is produced by transesterification after the injection of NDC, of this manufacturing method is distilled out at the top of distillatory tower and transferred to the wastewater treatment system. The EG produced by esterification is distilled out at the bottom of distillatory tower and transferred to other EG purifying distillatory to go on further distillation instead of being recycled back to the transesterification process.

In this manufacturing method, it should be assured that the transesterification of NDC has been completed and the produced methyl alcohol has been removed by distillatory. Otherwise, part of the non-reacted NDC will produce methyl alcohol during polymerization which causes the vacuum loading of polymerization and part of NDC will form dead-end group containing methyl ester so as not to further react to produce copolyester.

The reaction time of transesterification of said manufacturing method is about 1~4 hours, preferably 2~3 hours.

In the said esterification process, the heat stabilizer such as phosphoric acid or phosphorous acid, and the tonner such as cobaltous acetate can be added; besides, other character improving additive can be added as well.

The catalyst suitable for polymerization of this manufacturing method is the common antimony catalyst such as antimony trioxide, antimony acetate, or the germanium catalyst such as germanium dioxide, tetraethyl germanium oxide, n-tetrabutyl germanium oxide, or the titanium catalyst such as tetrabutyl titanium oxide. The quantity of the additive is between 0.001 wt % and 0.06 wt % (corresponding to the weight of polymer). The preferable polymerization catalyst for this manufacturing method is antimony trioxide with an preferable addition quantity of 300~600 ppm based on the weight of copolymer. While regarding the color of end polymer, the germanium dioxide can provide better color.

The copolyester obtained from the above said three manufacturing methods contains 5~15 mole % of NDC or NDA based on copolyester, preferably 8~15 mole %. The obtained copolyester needs to be further solid state polymerized so as to increase the intrinsic viscosity to 0.7~1.0, preferably 0.75~0.85, in order to be utilized in producing the one-way and pasteurizable bottle of the first practiced example disclosed by the present invention.

The solid state polymerization process suitable for the present invention is the process of utilizing batch or continuous solid state polymerization equipment on well-known vacuum condition or on a condition of transferring inert gas such as helium. The crystallization rate of the copolymer becomes slow due to the presence of NDC or NDA. Therefore, a pre-crystallization step is required before solid state polymerization to refrain chips from agglomeration. The present invention uses twin-awl shape vacuum solid state polymerization tank to which the copolyester is transferred. The vacuum intensity in the tank is vacuumed below 2 torr by vacuum pump. The temperature of chips is increased to 100~120° C. and maintained for 30 minutes to 2 hours and is further increased to 150~180° C. and maintained for 2~8 hours and is furthermore increased to 200~215° C. and maintained for 5 hours to 25 hours. The said condition of solid state polymerization varies with the viscosity increasing rate of solid state polymerization and the situation of chip agglomeration. Basically, the higher the added quantity of NDC or NDA, the smoother the proceeding condition. However, it takes longer time to reach the required intrinsic viscosity. The intrinsic viscosity of the present invention is between 0.70~1.0, preferably between 0.75~0.85, after solid state polymerization.

The copolyester obtained from the manufacturing method disclosed by the present invention is directly manufactured to bottles with a volume of 2 liters and a thickness of about 0.4 mm by an eject blow molder of Nippon Precision ASB 50H II model.

The bottle made of the copolyester obtained from the manufacturing method of the present invention is cut and spread to a sheet shape and measured the carbon dioxide permeability by PERMATRAN C4/40 of MOCON and measured the oxygen permeability by OXTRAN of MOCON.

The bottle made of the copolyester obtained from the manufacturing method of the present invention is filled with distilled water up to a certain line mark and soaked in a water basin with a constant temperature of 65° C. for 30 minutes. Then, the soaked bottle is taken out and measured the difference of the length of the bottle and the difference between the distilled water level and the certain line mark.

EXAMPLES EXPLANATION

Example 1~4

A set of batch type reaction composite equipment with a batch capacity of 12 kg copolyester is used as a reactor and the BHET monomer of PTA and EG with a degree of polymerization of about 5 is used as initiator (the monomer is obtained from the PTA process). The EG with the same amount of mole is then added. Moreover, 3 mole % of NDA (material No. is NDA-33, BP corp.) which is based on copolyester is added for Example 1; and 5 mole % of NDA which is based on copolyester is added for Example 2; and 8 mole % of NDA which is based on copolyester is added for Example 3; and 15 mole % of NDA which is based on copolyester is added for Example 4. While the temperature of the material reaches 190° C., start the esterification for 2 hours. The pressure of esterification is 1.0 kgf/cm$^2$ for the first one and half hours and normal pressure for the last half hour. Ten minutes before the end of esterification, add phosphoric acid as stabilizer and antimony acetate as catalyst and cobaltous acetate as toriier so as to proceed with pre-polymerization. The vacuum intensity changes from 760 torr to 20 torr for the first hour. Furthermore, the vacuum intensity reaches below one torr, preferably 0.5 torr, so as to proceed with polycondensation. The stirring current of the reactor increases as the polymerization degree increases. While the stirring current reaches a steady state (controlled by the control board), the rotation speed of the stirrer start to decrease. When the rotation speed of the stirrer decreases to 25 rpm (the rotation speed of the stirrer is set at 60 rpm at the beginning of the reaction), the reaction stops. The polymer in the reactor is compressed by nitrogen gas with a pressure of 1 kgf/cm$^2$ to column shape and is quickly cooled down by cooling water and is cut into chips.

The obtained copolyester is put into a twin-awl revolving vacuum drying tank to proceed with solid state polymerization in order to increase the viscosity of the copolyester. The tank is equipped with a set of vacuumizer. The exterior of the tank is jacketed with hot oil and insulating cotton. In the early stage of solid state polymerization for Example 1~3, the temperature of the hot oil is set at 120° C. and that of chips is about 110° C. for two hours. Then the temperature of the hot oil is set at 180° C. and that of chips is about 160° C. for four hours of heating time. The temperature of the hot oil is further set at 220° C. and that of chips reaches 200° C. and lasts 25 hours. Finally, the temperature of chips reaches 215° C. The copolyester for Example 4 can not further proceed with solid state polymerization due to its closing to complete amorphous state; consequently, it is dried at a temperature of 80 ° C. for eight hours.

The copolyester obtained from above said manufacturing method is manufactured by a Nippon Precision ASB eject blow molder to bottles with a volume of 2 liters. Then, the body portion of the bottle is cut and analyzed the permeability of oxygen and carbon dioxide.

To assure the obtained bottle can be pasteurized, the bottle is filled with distilled water and is caped and is put in a water tank with a constant temperature of 65° C. for 30 minutes. Then, the bottle is taken out and measured the variation of water level in the bottle of before and after pasteurization and the change of the body length of the bottle.

Comparative Example 1

The synthesis method and character testing method for this Comparative Example are the same with those of Example 1~3. However, 2.5 mole % of isophthalic acid is added instead of NDA for the Comparative Example.

The results of the said methods are listed in Table 1- 1 and Table 1-2 which show that the copolyester added with 5 mole % PEN not only decreases 16 percent of oxygen permeability but also passes the heat resisting test at 65° C. for 30 minutes. Therefore, it is certained by the present invention that the copolyester with higher than 5 mole % of PEN will have higher air impermeability and heat resistance. Particularly, the copolyester with 8 mole %~15 mole % of PEN is more suitable for one-way bottle which needs to be pasteurized. This kind of bottle has potential for being used as beer container. From cost point of view, this kind of bottle is one of very competitive alternatives despite its air impermeability and heat resistance being inferior to those of bottles made of pure PEN. Example 5~7

Utilize the reactor and measuring instrument and method similar to those of Example 1~4, and use di-ester as initiator. Add DMT, EG, NDC, and catalyst-manganese acetate into the reactor so as to proceed with transesterification reaction. The NDC contents are 5 mole %, 8 mole %, and 15 mole % based on copolyester for Example 5, 6, and 7 respectively. The mole ratio of EG against NDC and DMT is 2:1.

Manganese acetate acts as a transesterification catalyst with a concentration of 400 ppm. After the methyl alcohol which is a side product of transesterification is completely collected, the heat stabilizer- phosphoric acid and the polymerization catalyst-antimony trioxide and the tonner-cobaltous acetate are added to.proceed with the succeeding reaction of polymerization of the said Examples.

The results are shown in Table 2-1 and Table 2-2, which shows that the desired functions are very close to those of the copolyester synthesized by using NDA as raw material, which means that they are all capable of improving the air impermeability and heat resistance.

Comparative Example 2

The synthesis method and character testing method for this Comparative Example are the same with those of Example 5~7. However, NDC is not added for this Comparative Example. The mole ratio of EG against DMT is 2:1.

Example 8~11

Utilize the reactor and measuring instrument and method similar to those of Example 1~4. Add NDC, and catalyst for transesterification-manganese acetate into BHET monomer obtained from PTA process so as to proceed with transesterification reaction.

For Example 8, the time point for the addition of NDC is while the esterification ratio of BHET monomer reaches about 85 percent. The content of NDC is about 8 mole % based on copolyester.

For Example 9, the time point for the addition of NDC is while the esterification ratio of BHET monomer reaches about 85 percent. The content of NDC is about 15 mole % based on copolyester.

For Example 10, the time point for the addition of NDC is while the esterification ratio of BHET monomer reaches about 98 percent. The content of NDC is about 8 mole percent based on copolyester.

For Example 11, the time point for the addition of NDC is while the esterification ratio of BHET monomer reaches about 98 percent. The content of NDC is about 15 mole percent based on copolyester.

The amount of added manganese acetate is 400 ppm based on the content of BHEN, which means the amount of added manganese acetate (kg)=12/(molecular weight of PETNx)*(x/100)*(molecular weight of ethylene naphthalate)*400 ppm*$10^{-6}$ where molecular weight of PETNx=x*242+(1−x)*192 x stands for (number of mole*100 ) of ethylene naphthalate in copolyester, for example, 8 mole percent EN in PET copolyester can be expressed as PETN8, x=8 molecular weight of ethylene naphthalate=242

The mole ratio of EG against NDC is 2:1. Heat up to 180° C. so as to melt NDC. While the temperature of BHET reaches 170° C., into which the EG solution with NDC is injected.

The results are shown as Table 3-1 and Table 3-2.

TABLE 1-1

The copolyester produced by using NDA as raw material which is added into PTA process

| LOT NO | Comparative Example 1. | Example 1. | Example 2. | Example 3. | Example 4. |
|---|---|---|---|---|---|
| Component | | | | | |
| NDA-33 mole % | 0 | 3 | 5 | 8 | 15 |
| PIA mole % | 2.5 | 0 | 0 | 0 | 0 |
| $H_3PO_4$ ppm | 150 | 150 | 150 | 150 | 150 |
| $Sb(OAc)_3$ ppm | 500 | 500 | 500 | 500 | 500 |
| $Co(OAc)_2$ ppm | 100 | 100 | 100 | 100 | 100 |
| Temperature of esterification ° C. | 190~236 | 190~233 | 190~234 | 190~232 | 190~231 |
| Pressure of esterification kgf/$cm^2$ | 1.0 | 1.0 | 1.0 | 1.0 | 1.0 |
| Pressurized esterification time: min | 90 | 90 | 90 | 90 | 90 |
| Normal pressure esterification time: min | 30 | 30 | 30 | 30 | 30 |
| Temperature of prepolymerization ° C. | 221~255 | 225~257 | 226~252 | 225~253 | 226~255 |
| Duration of prepolymerization min | 60 | 60 | 60 | 60 | 60 |
| Temperature of main polymerization: ° C. | 252.4~286.5 | 257~282.6 | 252~283.5 | 253~284.6 | 255~281.7 |
| Vacuum intensity of main polymerization torr | 0.36 | 0.35 | 0.39 | 0.35 | 0.41 |
| Duration of main polymerization min | 107 | 112 | 112 | 111 | 103 |
| IV of raw chip dl/g | 0.634 | 0.597 | 0.603 | 0.591 | 0.62 |
| DEG content of raw chip mole % | 2.35 | 1.90 | 2.15 | 1.77 | 1.60 |
| Acid value of raw chip | 8 | 10 | 11 | 12 | 14 |
| Color of raw chip Lab (Hunter) | 49.95/ −0.81/ 2.77 | 49.56/ −0.80/ 3.52 | 50.30/ −1.45/ 4.11 | 50.40/ −1.5/ 4.3 | 49.10/ −2.1/ 5.51 |
| DSC analysis of raw chip ($2^{nd}$ run) | | | | | |
| Tg ° C. | 77.79 | 80.36 | 80.48 | 81.47 | 85.1 |
| Tch ° C. | 158.16 | 164.18 | 179.12 | 184.14 | 185.13 |
| ΔHc j/g | 32.08 | 32.94 | 27.88 | 23.22 | 5.21 |
| Tm ° C. | 244.33 | 246.31 | 240.53 | 234.18 | 222.1 |
| ΔHm j/g | 32.03 | 33.88 | 26.72 | 15.89 | 3.57 |
| Temperature of SSP ester chip ° C. | 200~215 | 200~215 | 200~215 | 200~205 | * |
| Duration of SSP hr | 25 | 25 | 25 | 25 | * |
| IV of SSP chip | 0.867 | 0.768 | 0.840 | 0.730 | * |

*The PET copolyester containing 15 mole % of EN is close to complete amorphous state so as not to easily proceed with solid state polymerization.

TABLE 1-2

Character of the bottle made of the copolyester produced by using NDA as raw material which is added into PTA process

| LOT NO | Comparative Example 1. | Example 1. | Example 2. | Example 3. | Example 4. |
|---|---|---|---|---|---|
| Temperature of Nippon Precision ASB 50H II melting blow molder | 275~280° C. | 275~280° C. | 280~285° C. | 285~290° C. | 275~280° C. |
| $O_2$ permeability of bottle body cc/m$^2$/day | 9.904 | 8.900 | 8.263 | 7.002 | 6.512 |
| $CO_2$ permeability of bottle body cc/m$^2$/day | 52.531 | 43.610 | 39.662 | 31.509 | 28.012 |
| Heat resistance test in pasteurization* | | | | | |
| Difference of water level in the bottle: mm | 31 | 24 | 19 | 14 | 8 |
| Change in the length of the bottle: mm | 2.5 | 2.0 | 1 | 0.5 | 0.5 |
| Evaluation on heat resistance | X | Δ | O | G | G |

*Condition for pasteurization: the bottle which is filled with distilled water at normal temperature is soaked in hot water with a temperature of 65° C. for 30 minutes.
X: change shape too much
Δ: change shape a little too much
O: OK
G: Good

TABLE 2-1

The copolyester produced by using NDC as raw material which is added into DMT process

| LOT NO | Comparative Example 2. | Example 5. | Example 6. | Example 7. |
|---|---|---|---|---|
| Component | | | | |
| NDC mole % | 0 | 5 | 8 | 15 |
| DMT mole % | 2.5 | 0 | 0 | 0 |
| $H_3PO_4$ ppm | 150 | 150 | 150 | 150 |
| $Sb_2O_3$ ppm | 500 | 500 | 500 | 500 |
| Co(OAc)$_2$ ppm | 100 | 100 | 100 | 100 |
| Temperature of transesterification ° C. | 158~230 | 160~234 | 160~232 | 160~231 |
| Pressure of transesterification kgf/cm$^2$ | Normal pressure | Normal pressure | Normal pressure | Normal pressure |
| Transesterification time: min | 240 | 240 | 240 | 240 |
| Temperature of prepolymerization ° C. | 230~263 | 234~264 | 232~263 | 231~263 |
| Duration of prepolymerization min | 80 | 80 | 80 | 80 |
| Temperature of main polymerization: ° C. | 263~286.5 | 264~283.5 | 263~284.6 | 263~281.7 |
| Vacuum intensity of main polymerization torr | 0.37 | 0.39 | 0.39 | 0.35 |
| Duration of main polymerization min | 120 | 121 | 125 | 115 |
| IV of raw chip dl/g | 0.630 | 0.615 | 0.608 | 0.580 |
| DEG content of raw chip mole % | 2.89 | 2.91 | 2.76 | 2.63 |
| Acid value of raw chip | 14 | 17 | 20 | 21 |
| Color of raw chip Lab (Hunter) | 45.35/ −0.72/ 2.89 | 45.79/ −0.31/ 3.10 | 45.67/ −0.55/ 3.22 | 44.12/ −0.17/ 3.79 |

TABLE 2-1-continued

The copolyester produced by using NDC as raw material which is added into DMT process

| LOT NO | Comparative Example 2. | Example 5. | Example 6. | Example 7. |
|---|---|---|---|---|
| DSC analysis of raw chip (2$^{nd}$ run) | | | | |
| Tg ° C. | 77.71 | 80.5 | 81.08 | 85.1 |
| Tch ° C. | 157.46 | 180.15 | 185.8 | 188.37 |
| ΔHc j/g | 33.58 | 24.38 | 9.53 | 4.23 |
| Tm ° C. | 244.10 | 240.36 | 232.12 | 223.1 |
| ΔHm j/g | 32.53 | 22.72 | 6.795 | 2.93 |
| Temperature of SSP ester chip ° C. | 200~215 | 200~215 | 200~205 | * |
| Duration of SSP hr | 25 | 25 | 25 | * |
| IV of SSP chip | 0.854 | 0.850 | 0.773 | * |

*The PET copolyester containing 15 mole % of EN is close to complete amorphous state so as not to easily proceed with solid state polymerization.

TABLE 2-2

Character of the bottle made of the copolyester produced by using NDA as raw material which is added into PTA process

| LOT NO | Comparative Example 2. | Example 5. | Example 6. | Example 7. |
|---|---|---|---|---|
| Temperature of Nippon Precision ASB 50H II melting blow molder | 275~280° C. | 280~285° C. | 285~290° C. | 275~280° C. |
| $O_2$ permeability of bottle body cc/m$^2$/day | 11.163 | 9.460 | 7.814 | 7.125 |
| $CO_2$ permeability of bottle body cc/m$^2$/day | 55.457 | 48.802 | 37.156 | 33.274 |
| Heat resistance test in pasteurization* | | | | |
| Difference of water level in the bottle: mm | 30 | 18 | 15 | 8 |
| Change in the length of the bottle: mm | 2.4 | 0.9 | 0.5 | 0.4 |
| Evaluation on heat resistance | X | O | G | G |

*Condition for pasteurization: the bottle which is filled with distilled water at normal temperature is soaked in hot water with a temperature of 65° C. for 30 minutes.
X: change shape too much
Δ: change shape a little too much
O: OK
G: Good

TABLE 3-1

The copolyester produced by using NDC as raw material which is added into PTA process

| LOT NO | Comparative Example 1. | Example 8. | Example 9. | Example 10. | Example 11. |
|---|---|---|---|---|---|
| Component | | | | | |
| NDC mole % | 0 | 8 | 15 | 8 | 15 |
| Injection time point | | BHET C % = 85 | BHET C % = 85 | BHET C % = 98 | BHET C % = 98 |
| PIA mole % | 2.5 | 0 | 0 | 0 | 0 |
| $H_3PO_4$ ppm | 150 | 150 | 150 | 150 | 150 |

TABLE 3-1-continued

The copolyester produced by using NDC as raw material which is added into PTA process

| LOT NO | Comparative Example 1. | Example 8. | Example 9. | Example 10. | Example 11. |
|---|---|---|---|---|---|
| $Sb_2O_3$ ppm | 500 | 415 $Sb(OAc)_3$ | 415 | 415 | 415 |
| $Co(OAc)_2$ ppm | 100 | 100 | 100 | 100 | 100 |
| Temperature of esterification/transesterification °C. | 190~236 | 158~233 | 159~234 | 158~232 | 158~231 |
| Pressure of esterification kgf/cm² | | Normal pressure | Normal pressure | Normal pressure | Normal pressure |
| Esterification/transesterification time min | Pressure esterification 90 normal pressure ester 30 | 120 | 120 | 120 | 120 |
| Temperature of prepolymerization °C. | 236~255 | 233~257 | 234~252 | 232~253 | 231~255 |
| Duration of prepolymerization min | 60 | 60 | 60 | 60 | 60 |
| Temperature of main polymerization °C. | 252.4~286.5 | 257~284.2 | 252~286.3 | 253~286.6 | 255~286.7 |
| Vacuum intensity of main polymerization torr | 0.36 | 0.39 | 0.45 | 0.45 | 0.43 |
| Duration of main polymerization min | 107 | 135 | 141 | 90 | 97 |
| IV of raw chip dl/g | 0.634 | 0.597 | 0.578 | 0.608 | 0.590 |
| DEG content of raw chip mole % | 2.35 | 2.57 | 3.11 | 2.97 | 2.92 |
| Acid value of raw chip | 8 | 13 | 17 | 12 | 17 |
| Color of raw chip Lab (Hunter) | 49.95/ −0.81/ 2.77 | 38.52/ 0.21/ 4.36 | 40.10/ 0.32/ 4.82 | 46.17/ −0.85/ 3.58 | 42.56/ −0.70/ 4.11 |
| DSC analysis of raw chip (2nd run) | | | | | |
| Tg °C. | 77.79 | 81.9 | 80.48 | 81.47 | 85.1 |
| Tch °C. | 158.16 | 184.8 | 187.44 | 185.8 | 183.7 |
| ΔHc j/g | 32.08 | 17.9 | 0.99 | 9.53 | 1.21 |
| Tm °C. | 244.33 | 233.1 | 228.73 | 232.1 | 225.5 |
| ΔHm j/g | 32.03 | 12.7 | 0.43 | 6.80 | 0.98 |
| Temperature of SSP ester chip °C. | 200~215 | 200~215 | * | 200~205 | * |
| Duration of SSP hr | 25 | 25 | * | 25 | * |
| IV of SSP chip | 0.867 | 0.763 | * | 0.745 | * |

*The PET copolyester containing 15 mole % of EN is close to complete amorphous state so as not to easily proceed with solid state polymerization.

TABLE 3-2

Character of the bottle made of the copolyester produced by using NDC as raw material which is added into PTA process

| LOT NO | Comparative Example 1. | Example 8. | Example 9. | Example 10. | Example 11. |
|---|---|---|---|---|---|
| Temperature of Nippon Precision ASB 50H II melting blow molder | 275~280° C. | 285~290° C. | 275~280° C. | 285~290° C. | 275~280° C. |
| $O_2$ permeability of bottle body cc/m²/day | 9.904 | 8.126 | 7.105 | 7.932 | 6.955 |
| $CO_2$ permeability of bottle body cc/m²/day | 52.531 | 35.761 | 29.896 | 33.758 | 29.825 |
| Heat resistance test in pasteurization* | | | | | |
| Difference of water level in the bottle: mm | 31 | 14 | 9 | 13 | 9 |
| Change in the length of the bottle: mm | 2.5 | 0.6 | 0.4 | 0.6 | 0.4 |
| Evaluation on heat resistance | X | G | G | G | G |

*Condition for pasteurization: the bottle which is filled with distilled water at normal temperature is soaked in hot water with a temperature of 65° C. for 30 minutes.
X: change shape too much
Δ: change shape a little too much
O: OK
G: Good

What is claimed is:

1. A manufacturing method of a copolyester containing ethylene naphthalate unit, whereby the copolyester is obtained from one of the following manufacturing methods:

(1) Add 2,6-naphthalenedicarboxylic acid (NDA) into the thick liquid or esterification stage of purified terephthalic acid (PTA) process and when the esterification ratio reaches 95 percent, add a polymerization catalyst so as to proceed with polycondensation;

(2) Add dimethyl 2,6-naphthalenedicarboxylate (NDC) into dimethyl terephthalate (DMT) solution before transesterification taking place in DMT process, additionally adding a transesterification catalyst and when the side product-methyl alcohol is completely removed, add the polymerization catalyst so as to proceed with polycondensation; and (3) Add dimethyl 2,6-naphthalenedicarboxy atc while the esterification ratio of PTA process reaches85%~998%, concurrently adding the transesterification catalyst and when the side product-methylalcohol is completely removed, add the polymerization catalyst so as to proceed with polycondensation, and its product, comprising: the copolyester obtained from copolymerization has 5~15 mole % of the NDA or NDC and has the following structure:

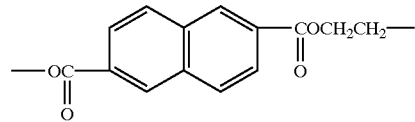

and its intrinsic viscosity is between 0.3~0.7 dl/g.

2. A manufacturing method of the copolyester containing ethylene naphthalate unit as defined in claim 1, wherein said transesterification catalyst in item (2) is manganese acetate or zinc acetate with an added amount of 100~500 ppm based on the quantity of copolyester.

3. A manufacturing method of the copolyester containing ethylene naphthalate unit as defined in claim 1, wherein said transesterification catalyst in item (3) is manganese acetate or zinc acetate with an added amount of 100~500 ppm based on the total quantity of ethylene naphthalate unit.

4. A manufacturing method of the copolyester containing ethylene naphthalate unit as defined in claim 1, wherein the injection time point of said dimethyl 2,6-naphthalenedicarboxylate in item (3) is at 93~97.5%.

5. A manufacturing method of the copolyester containing ethylene naphthalate unit as defined in claim 1, wherein said polymerization catalyst is selected from the group consisting of antimony catalysts, germanium catalysts and titanium catlysts and the amount of addition is 10~600 ppm based on the weight of copolyester.

6. A manufacturing method of the copolyester containing ethylene naphthalate unit as defined in claim 1, wherein said polymerization catalyst in item (3) is antimony trioxide, and the amount of addition is 300~600 ppm based on the weight of copolyester.

7. A manufacturing method of the copolyester containing ethylene naphthalate unit as defined in claim 1, wherein the primary component of the copolyester is polyethylene terephthalate (PET).

8. A manufacturing method of the copolyester containing ethylene naphthalate unit as defined in claim 1, wherein the content of ethylene naphthalate unit is 8~15 mole % based on the copolyester.

9. A manufacturing method of the copolyester containing ethylene naphthalate unit as defined in claim 1, wherein the obtained copolyester has an intrinsic viscosity between 0.7~1.0 dl/g after solid state polymerization.

10. A bottle derived from the manufacturing method of the copolyester containing ethylene naphthalate as defined in claim 1, wherein the bottle is pasteurizable.

11. A manufacturing method of the copolyester containing ethylene naphthalate unit as defined in claim 4, wherein the injection time point of said dimethyl 2,6-naphthalenedicarboxylate in item (3) is at 96~97.5%.

12. A manufacturing method of the copolyester containing ethylene naphthalate unit as defined in claim 1, wherein said polymerization catalyst is selected from the group consisting of antimony trioxide, antimony acetate, germanium dioxide, tetraethyl germanium oxide, n-tetrabutyl germanium oxide and tetrabutyl titanium oxide, and the amount of addition is 10~600 ppm based on the weight of copolyester.

* * * * *